United States Patent
Colletti

[11] 3,753,375
[45] Aug. 21, 1973

[54] RACK AND PINION STEERING GEAR
[75] Inventor: John B. Colletti, Grosse Pointe Park, Mich.
[73] Assignee: TRW Inc., Cleveland, Ohio
[22] Filed: Nov. 29, 1971
[21] Appl. No.: 202,867

[52] U.S. Cl.......................... 74/498, 74/396, 74/422
[51] Int. Cl............................................... B62d 3/12
[58] Field of Search...................... 74/498, 497, 499, 74/500, 396, 422

[56] References Cited
UNITED STATES PATENTS
1,332,161  2/1920  Dahlen................................. 74/498
2,547,784  4/1951  Saives................................ 74/396 X
2,648,230  8/1953  Stallsmith ............................ 74/396
3,623,379  11/1971  Bradshaw et al. .................... 74/498

FOREIGN PATENTS OR APPLICATIONS
613,432  12/1960  Italy..................................... 74/498

Primary Examiner—Milton Kaufman
Attorney—Carlton Hill, Donald J. Simpson et al.

[57] ABSTRACT

A rack and pinion steering gear wherein the rack bar is supported in the rack tube by bearing sleeves journalled in the axial open ends of the tube without use of a yoke. In order to provide alignment adjustment, the pinion has at least one end thereof supported in an adjustable eccentrically mounted spherical bearing to allow movement of the pinion with regard to the rack.

2 Claims, 5 Drawing Figures

PATENTED AUG 21 1973　　3,753,375
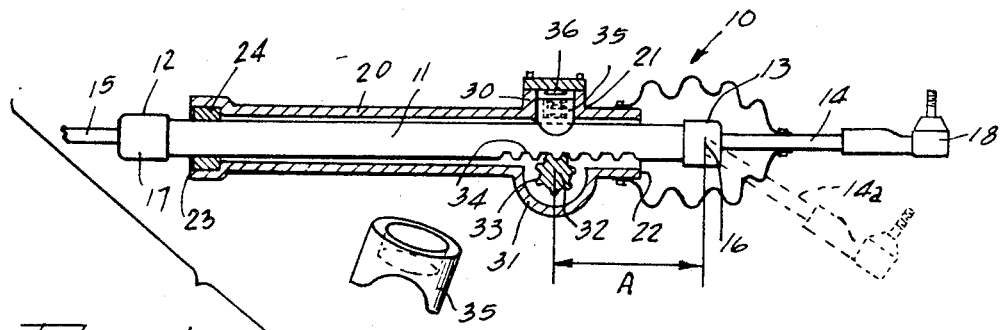
Fig-1 (PRIOR ART)
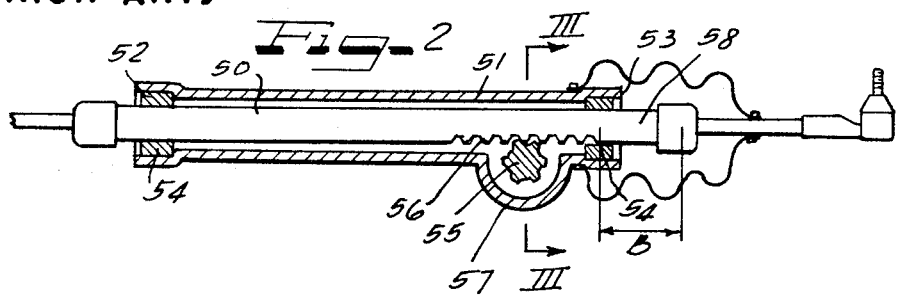
Fig-2
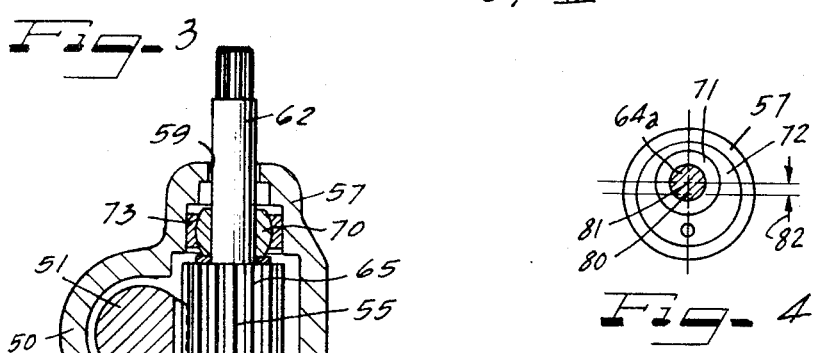
Fig-3
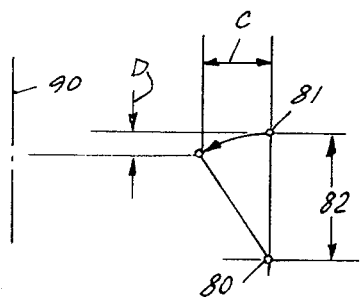
Fig-4
Fig-5

RACK AND PINION STEERING GEAR

BACKGROUND OF THE INVENTION

1. Field of the Invention

This invention relates to steering gear assemblies and more particularly to a rack and pinion steering gear assembly.

2. Prior Art

Rack and pinion steering assemblies such as those used to control the attitude of the dirigible wheels of a vehicle have generally included a rack bar mounted for axial movement in a rack tube through which a pinion projects transversely, the pinion teeth engaging the teeth of the rack section of the rack bar. In order to provide for support and alignment of the rack and to maintain contact between the rack and the pinion, the rack bar was supported at one end of the rack tube through a sleeve bushing. The other end of the rack tube normally did not provide support for the rack bar, the rack bar being contacted by a yoke positioned opposite the pinion to urge the rack bar against the pinion. Therefore, support for the rack bar constituted the sleeve bushing on one end of the rack tube and the pinion-yoke contact intermediate the ends of the tube. This provided a moment arm for bending forces between the end of the rack bar unsupported by a sleeve bushing and the pinion.

When road loads occurred in certain situations, the bending moment applied to the rack at that length would have to be absorbed by the yoke bearing in the one direction and by the pinion in the other direction. When such loads were sufficient, damage to one or the other of the components could occur.

SUMMARY OF THE INVENTION

My invention overcomes the above disadvantage of the prior art by providing a sleeve bushing at either end of the rack tube so that the rack bar is supported independent of the pinion. The need for a yoke is eliminated.

In order to provide for adjustability of the pinion with regard to the teeth of the rack, which adjustability is necessary because of the support of the rack at both ends of the rack tube, I mount at least one end of the pinion in a spherical bearing which is supported eccentrically in a housing which constitutes the rack tube and the pinion housing. The eccentric mount allows for movement of the pinion towards and away from the rack in such a manner as to provide at the same time a minimal movement parallel to the rack.

It is therefore an object of this invention to provide an improved rack and pinion steering gear assembly.

It is another object of this invention to provide a rack and pinion steering gear assembly which eliminates the need for a yoke.

It is a further and more specific object of this invention to provide a rack and pinion steering gear assembly wherein the rack is supported at opposite ends of the rack bar by bushings.

It is yet another and more specific object of this invention to provide a rack and pinion steering gear assembly wherein the pinion is adjustably received in the housing.

It is a specific object of this invention to provide a rack and pinion steering gear assembly wherein the rack bar is supported at either ends of the rack tube in bushings and the pinion is adjustably supported in the rack tube housing by means of an eccentric mount of one end of the pinion.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a fragmentary cross-sectional view of a prior art rack and pinion steering assembly, illustrating the use of a yoke.

FIG. 2 is a view similar to FIG. 1 of the rack and pinion steering assembly of this invention.

FIG. 3 is a cross-sectional view taken along the lines III—III of FIG. 2, illustrating the pinion.

FIG. 4 is a cross-sectional view taken along the lines IV—IV of FIG. 3, illustrating the pinion mount.

FIG. 5 is a diagrammatic view of the eccentric adjustability of the pinion of this invention.

DESCRIPTION OF THE PREFERRED EMBODIMENTS

FIG. 1 illustrates a typical prior art rack and pinion steering gear assembly 10. The assembly includes a rack bar 11 having axial ends 12 and 13 to which are attached tie rods 14 and 15. The tie rods are attached to the axial ends through articulatable joints 16 and 17, which allow movement of the tie rods with respect to the rack bar as is illustrated at 14a. The tie rods may terminate in ball joints 18 for attachment to the dirigible wheels of the vehicle. The rack bar, intermediate its ends, is received axially through a rack tube 20 which has a housing bulge portion 21 therein adjacent to one end 22 of the rack tube. The other end 23 of the rack tube 20 is spaced from the housing bulge 21 and contains a sleeve bushing or bearing 24 which surrounds the rack bar 11 and supports it in the open end 23 of the rack tube 20. Normally both the open end 23 and the rack bar are circular as is the bushing 24.

The housing bulge 21 includes an upper bulge 30 and a lower bulge 31. The lower bulge receives, transversely of the rack tube, a pinion 32 having outer diameter teeth 33 thereon. The rack bar contains a toothed section or rack 34, the teeth of which intermesh with the teeth of the pinion. Therefore, when the pinion is rotated, the rack is moved laterally, causing a shifting of the tie rods. In order to support the rack bar in the rack tube and to assure a contact between the rack teeth and the pinion teeth, a yoke 35 is positioned in the upper bulge portion 30 and is urged, as by means of a spring 36, against the surface of the rack bar opposite the rack. Normally the yoke 35 is positioned opposite the pinion.

The yoke holds the rack against the pinion and is usually adjusted to a predetermined clearance. Therefore, the rack bar is positioned in the rack tube and maintained in axial position therein by a support constituting the sleeve bushing 24 and the pinion 32 and yoke 35.

In such prior art steering systems, because the support for the rack bar was positioned at the pinion and yoke, a bending moment arm exists between the end 13 of the rack bar and the support point of the pinion and yoke. This distance A, although subject to change with movement of the rack bar, can be large enough to disadvantageously affect the stability of the system. At times, the pressure can be great enough to damage portions of the system. Additionally, a non-desirable function is imposed on the pinion in that it becomes a load-bearing point which requires additional and costly design criteria for the pinion and housing support therefor.

Since the tie rods 14, 15 are free to articulate, as is illustrated at 14a, when road loads occur with the tie rod at an angle to the rack, the bending moment is applied to the rack at the length A. This load must be absorbed either by the yoke in one direction or by the pinion in the other direction. The direction of the load is a function of both the cause of the load, as for example, wheel shocks encountered upon dropping of the wheel into a hole in the road, and thereafter jolting out of the hole, and the attitude of the wheels at the time of the application of the load and the position of the tie rod with respect to the wheel. The design of typical prior art assemblies as illustrated in FIG. 1 had to take all of these factors into consideration in designing the support for the pinion and the placement and strength of the yoke.

My invention, on the other hand, as best illustrated in FIG. 2, eliminates the use of the yoke and further eliminates the use of the pinion as a bearing member.

As illustrated in FIG. 2, the rack bar 50 is received in a rack tube 51 having axial ends 52 and 53. Each of the axial ends 52,53 contains therein a sleeve bushing 54 providing the support for the rack bar. Thus, the rack bar 50 is supported by the rack tube at either end of the rack tube in the bushings 54. The pinion 55 is positioned below the rack 56 and is received in a bulge portion 57 of the rack tube housing. Because the axial end 58 of the rack bar 50 closest to the pinion is supported by the bushing 54 rather than by the pinion, the bending moment arm mentioned above has a length B as opposed to the greater length A of the prior art steering linkages as illustrated in FIG. 1.

A yoke such as the yoke 35 of the prior art linkages functions to maintain the rack teeth in mesh with the pinion teeth. Because the yoke has been eliminated in my steering gear assembly, I have mounted the pinion in such a way that it can be moved with respect to the rack so as to allow it to be adjusted to intermesh correctly. The pinion 55 is received interiorly of the bulge portion 57 of the rack tube housing perpendicular to the axis of the rack bar 51. The housing has two openings 59,60 at either end of the bulge area axially of the pinion as illustrated in FIG. 3. The stem 62 of the pinion projects through the opening 59 and an opposite end portion 64 of the pinion terminates adjacent the open end 60 of the housing. The toothed area 65 of the pinion is positioned intermediate the ends and is aligned with the rack bar whereby the rack straddles the toothed area of the pinion. Spherical bearings 70 and 71 are received around the shaft 62 and the cylindrical extension 64a projecting from the toothed area to the end 64. The spherical bearing 70, in the illustrated embodiment, is received in a spherical inner diameter housing member 73 whereby the arcuately curved inner diameter of the housing member 73 mates with the arcuately curved outer diameter of the spherical bearing member 70. The housing member 73 is snugly received in the housing 57 adjacent the opening 59 and supports the shaft 62.

The spherical bearing member 71 is received in a bearing housing member 72, which has a mating configured opening 75 which is arcuately curved to receive the spherical bearing 71. The opening 75 is positioned off center in the bearing housing member 72. That is to say that the axis of the opening 75 is not the axis of the opening in the housing in which the disc-shaped bearing housing member 72 is received. The bearing housing member 72 is received in a circular inner cavity area 78 of the housing 57 and is maintained therein as by means of an outer diameter threaded nut 74.

In FIG. 4, the axial centerpoint of the bearing housing member 72 and of the opening 78 in which it is received is indicated at 80. The axial centerpoint of the opening 75 in the spherical bearing housing member 72 is indicated at 81. The difference between the two, or the amount of eccentricity, is indicated at 82.

In the preferred embodiment, the eccentric distance 82 is aligned parallel to the centerline of the rack 51 when the assembly is manufactured.

By aligning the eccentric distance parallel with the centerline, adjustment of the pinion with respect to the rack can be accomplished merely by rotating the spherical bearing mounting housing 72 a slight amount in the opening 78. This rotation produces a maximum movement of the pinion towards the rack with a minimum movement of the pinion parallel to the rack, which could result in mismatch of the pinion teeth to rack teeth. This is illustrated diagrammatically in FIG. 5, wherein the axial centerline of the spherical bearing mounting housing 72 is indicated at 80, and the assembled centerline of the opening 75 is indicated at 81. It can be seen that by rotating the mounting member 72, the centerline of the pinion will be moved towards the rack by the distance C where it is moved parallel to the rack only by the distance D, the rack centerline being indicated at 90. It is to be understood that one or both of the bearings may be adjustable and that the spherical bearings illustrated may be different as by way of example, they may be the outer member of a ball bearing assembly.

It can therefore be seen from the above that my invention provides a rack and pinion steering gear assembly wherein the rack is supported in the rack tube by bushings positioned at the ends of the rack tube, the rack being prevented from movement other than axial with respect to the tube and the pinion being adjustably mounted in spherical bearings whereby it can be moved towards and away from the rack.

Although the teachings of my invention have herein been discussed with reference to specific theories and embodiments and although illustrative means for accomplishing explained results have been described, it is to be understood that these are by way of illustration only and that others may wish to utilize my invention in different designs or applications.

I claim as my invention:

1. A rack and pinion steering wheel assembly comprising a rack housing, said rack housing having spaced-apart open axial ends, a rack tube projecting through said housing axially thereof and projecting beyond the axial ends, bushings received in the housing adjacent the axial ends thereof, the bushings slidably supporting the rack bar in the housing, a pinion projecting transversely of said rack bar through said housing, means attached to said housing transversely of said rack bar on both sides of said rack bar rotatably supporting said pinion in said housing, said pinion having teeth intermeshing with the rack bar, said means supporting said pinion including bearings on both sides of said rack bar supporting said pinion, at least one of said bearings eccentrically mounted in said housing, the eccentric distance between the centerline of the one bearing and the centerline of the pinion lying in a plane parallel to the centerline of the rack, the eccentrically mounted bearing being a spherical bearing having a spherical outer surface received in an opening in a mounting member, said mounting member having a cylindrical outer diameter surface rotatably received in a cylindrical portion of the housing, said opening in the said mounting member eccentric to the cylindrical outer diameter of the mounting member, said mounting member rotatable in said housing, and means restricting rotation of said mounting member.

2. The assembly of claim 1 wherein another of said bearings having a spherical outer surface received in a mating mounting member supports the pinion in the housing on the opposite side of the rack bar from the one of said bearings.

* * * * *